United States Patent [19]
Zaid

[11] Patent Number: 4,713,184
[45] Date of Patent: Dec. 15, 1987

[54] DISPERSED OIL SOLUBLE CORROSION INHIBITOR AND WATER SOLUBLE PHOSPHONATE SCALE INHIBITOR COMPOSITION

[76] Inventor: Najib H. Zaid, 213 E. Monroe, Sterling, Kans. 67579

[21] Appl. No.: 780,449

[22] Filed: Sep. 26, 1985

[51] Int. Cl.$^4$ .................. E21B 37/00; C23F 11/14
[52] U.S. Cl. ............................ 252/8.552; 252/8.555
[58] Field of Search ............... 252/8.55 B, 8.55 E, 252/8.552, 8.555

[56] References Cited

U.S. PATENT DOCUMENTS

| | | | |
|---|---|---|---|
| 2,468,163 | 4/1949 | Blair et al. | 252/8.55 |
| 3,017,354 | 1/1962 | Riggs | 252/8.55 |
| 3,412,024 | 11/1968 | Stanford | 252/8.55 |
| 3,623,979 | 11/1971 | Maddox et al. | 252/8.55 |
| 3,699,118 | 10/1972 | Donham | 252/8.55 |
| 3,712,862 | 1/1973 | Bundrant et al. | 252/8.55 |
| 3,770,815 | 11/1973 | Jones | 252/8.55 |

Primary Examiner—Herbert B. Guynn
Attorney, Agent, or Firm—Schmidt, Johnson, Hovey & Williams

[57] ABSTRACT

A combination corrosion/scale inhibitor composition for use in oil or gas wells is provided which is in the form of a substantially homogeneous dispersion so as to facilitate use and well coverage of the composition, and to minimize well downtime. The overall composition preferably includes a preblend having an imidazoline-based corrosion inhibitor and an organophosphonic scale inhibitor, together with an organic solvent and an alkylphenol ethoxylate surfactant; the preblend is then field-mixed with water or crude oil to yield a final treating composition. In practice the final composition may be introduced into the well in bulk or over time so as to achieve full coverage of down-hole equipment with both the corrosion and scale inhibitor.

30 Claims, No Drawings

DISPERSED OIL SOLUBLE CORROSION INHIBITOR AND WATER SOLUBLE PHOSPHONATE SCALE INHIBITOR COMPOSITION

BACKGROUND OF THE INVENTION

1. Field of the Invention

This invention broadly relates to corrosion and scale inhibitors typically used by the oil and gas industries for treatment of their oil and gas wells and transmission lines. More particularly, it is concerned with the discovery that certain relatively critical components and proportions thereof can be employed to prepare a combination corrosion/scale inhibitor composition for use in oil or gas wells which is in the form of a substantially homogeneous dispersion or solution that facilitates use and well coverage of the composition.

2. Description of the Prior Art

It is well known that oil and gas wells are subject to corrosion. Well equipment such as sucker rods, pump rods, tubing, casing and transmission lines are made of mild steel which is adversely affected by the production fluid of the well. The often high temperatures and acidic nature of the fluid magnifies the corrosion problems associated with well equipment.

It is also a well known problem with oil and gas wells that scaling can occur within the well. When scale forms on the well equipment or in the formation it can effectively restrict the flow of fluids thereby resulting in decreased production from the well. Common scale-forming material found in producing fluids includes magnesium sulfate, magnesium carbonate, calcium carbonate, calcium sulfate and barium sulfate.

In order to meet these problems, the oil and gas industries have used various corrosion and scale inhibitors in downhole applications. The corrosion inhibitors are typically aqueous dispersions which may contain a variety of corrosion inhibiting components, e.g., 2-mercaptobenzothiazole, benzotriazole, tolyltriazole, phosphates, polyphosphates, organic soluble polymers, silicates, dithiocarbamates, nitrites, oxazoles, imidazoles, lignins, lignosulfonate, tannins, phosphoric acid esters, and boric acid esters. On the other hand, scale inhibitors such as alkali metal phosphates, alkali metal tripolyphosphates, alkali pyrophosphates have been used in the past.

Generally speaking, use of these types of inhibitors has involved shutting down the well, injecting the inhibitor while running the well pump(s), and in some cases flushing the inhibitors. This is a costly exercise, not only in terms of ingredients, but also down time for the well.

Attempts have been made to ameliorate these problems by combining corrosion and scale inhibitors in a single system. However, the inherent insolubility of many corrosion inhibitors in the aqueous systems of the scale inhibitors has made it impracticable to combine the two components. This problem is especially acute when partial barrel quantities of such a combined inhibitor are used, inasmuch as phase separation between the two inhibitors makes it difficult to obtain the correct proportions in the utilized quantity. As a result, corrosion and scale inhibitors have generally been packaged, sold, handled, stored and used separately even though this practice is a distinct disadvantage from a cost viewpoint.

SUMMARY OF THE INVENTION

The problems outlined above are in large measure solved by the scale and corrosion inhibiting compositions of the present invention. Broadly speaking, the compositions are preferably in the form of a dilutable preblend having therein an imidazoline-based corrosion inhibitor including imidazoline and oligomers of $C_{12}$-$C_{22}$ fatty acids, together with an organophosphonic scale inhibitor and an alkyl phenolethoxylate surfactant.

The imidazoline component should advantageously be present in the preblend composition at a level of from about 2 to 25% by weight. The oligomers of fatty acid should be present at a level of from about 2 to 35% by weight, and the most preferred oligomers are the dimers and trimers of oleic or linoleic acid. More broadly however, the oligomers should contain an average of about 2-4 monomers per polymerized molecule.

The scale inhibitor should be present at a level of from about 2 to 25% by weight in the preblend composition, and in this instance the most preferred scale inhibitor is aminotris(methylene phosphonic acid). Other scale inhibitors useful in the invention include hydroxyethylidene diphosphonic acid, or admixtures of the foregoing with up to about 50% by weight polyacrylic acid mixed therewith.

The surfactant is advantageously selected from the group consisting of alkylphenol ethoxylate surfactants having an average of from about 4 to 12 ethylene oxide groups per molecule. Moreover, the alkyl moiety should have from about 6 to 22 carbon atoms therein, and most preferably 8 or 9 carbon atoms. The selected surfactant or surfactants should be present at a level of from about 2 to 50% by weight of the overall preblend.

The preblend compositions in accordance with the invention are in the form of liquid, essentially homogeneous dispersions. Indeed, preferred compositions (both preblends and final downhole compositions) in accordance with the invention exhibit virtually complete homogeneity at ambient temperatures for a period of at least six months. Such homogeneity is important for purposes of the present invention, inasmuch as this facilitates proper use of the composition in downhole applications. However, those skilled in the art will readily appreciate that the desirable homogeneous state can be obtained in varying degrees by appropriate manipulation of the specific molecular species employed in the composition, as well as by using differing quantities thereof.

Use of preblends in accordance with the invention normally involves a substantial dilution of the preblends with water. Typically, the final diluted downhole composition would include from about 10 to 200 parts per million (ppm) of preblend therein. Most preferably, the final composition is prepared by mixing 55 gallons of the preferred preblend with about 4,000 gallons of water. The final downhole composition can be introduced either in bulk into the well hole, or metered over time so as to achieve full coverage and consequent corrosion and scale inhibition.

DESCRIPTION OF THE PREFERRED EMBODIMENTS

As noted above, the corrosion inhibition fraction of the preblend includes an imidazoline. Various imidazoline derivatives can also be employed, and the most preferred derivatives are set forth in the following structural formula:

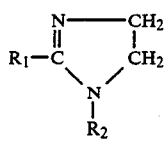

wherein $R_1$ is hydrogen or an alkyl group having up to 18 carbon atoms therein, and $R_2$ is hydrogen, or an alkyl or amine group having up to 18 carbon atoms therein.

While the imidazoline may be present at a level of from about 1.5 to 25% by weight in the preblend, in more preferred forms this component should be present at a level of from about 2 to 9% by weight, and most preferably at a level of about 5% by weight.

The fatty acid oligomer component of the preblend composition may be present at a level of from about 2 to 35% by weight in the preblend, more preferably from about 3 to 12% by weight, and most preferably about 6% by weight. While the most preferred oligomer is formed of monomers of oleic or linoleic acid, more broadly fatty acids having from 12 to 22 carbon atoms may be employed. Dimers and trimers are the preferred oligomers, but more generally from about 2 to 4 monomers should be present on the average in the oligomer.

As indicated, the scale inhibitor forming a part of the preblend is preferably selected from the group consisting of organophosphonic acids and salts thereof. The scale inhibitor should be present in the preblend at a level of from about 2 to 25% by weight, more preferably from about 2 to 10% by weight, and most preferably about 5% by weight. The most preferred scale inhibitor is aminotris(methylene phosphonic acid). Other scale inhibitors include hydroxyethylidene diphosphonic acid, and the aforementioned two acids in admixture with polyacrylic acid (e.g., up to about 50% by weight polyacrylic acid).

The surfactant component is advantageously selected from the group consisting of alkylphenol ethoxylate surfactants having an average of from about 4 to 12 ethylene oxide groups per molecule. The alkyl moiety should contain from about 6 to 22 carbon atoms therein, and more preferably 8 or 9 carbon atoms. The most preferred component is nonylphenol ethoxylate having about 6 ethylene oxide groups per molecule. Broadly, the surfactant should be present at a level of from about 2 to 50% by weight, more preferably from about 7 to 25% by weight, and most preferably about 17% by weight.

The solvent used in preferred forms of the present invention is normally selected from the group consisting of liquid petroleum products (e.g., kerosene and diesel fuel), and aromatic liquids such as xylene, toluene, the napthas, and mixtures thereof. The solvent may be present at a level necessary to make up the remainder of the preblend, and more broadly from about 5 to 90% by weight; more preferably, the solvent should be present at a level of from about 16 to 82% by weight, and most preferably about 43% by weight.

Isopropyl or absolute alcohol can also form a part of the preblend composition. The alcoholic component serves to enhance the homogeneity of the composition, particularly in subfreezing temperature conditions. When employed, the alcohol should be present at a level of from about 1 to 20% by weight, more preferably at a level of about 2 to 10% by weight, and most preferably about 4% by weight.

In addition, dimethylamide of tall oil fatty acid can also be used to good effect in the preblend composition, and in this event the component should be present at a level of from about 1 to 20% by weight, more preferably from about 1 to 10% by weight, and most preferably about 4% by weight.

A minor fraction of water is also present in the preferred forms of the preblend, namely from about 1 to 15% by weight, more preferably about 1 to 8% by weight, and most preferably about 3% by weight.

In actual practice, the preferred corrosion inhibitor employed is purchased from Buckman Laboratories, Inc. of Memphis Tenn., under the designation BL-310. This is an oil soluble, water dispersible corrosion inhibitor designed for downhole use in oil and gas wells and for the protection of oil and gas transmission lines. This product has a viscosity (77° F.) of 78 cps, a pour point of −18° F., an approximate weight per U.S. gallon of 7.6 lb., a color of brownish yellow, and a flashpoint (Tagliabue closed cup) of 90° F. This material is fully described in a product bulletin entitled "Development Product BL-310 Corrosion Inhibitor For The Petroleum Industry", and which is incorporated herein by reference. In particular, the BL-310 product contains (on an approximate basis and taking the quantity of BL-310 as 100% by weight): 15% imidazoline; 20% by weight of a mixture of dimer and trimer of oleic and linoleic acid commercialized under the designation "DTA 350" and sold by Witco Chemical Corp. of Melrose Park, Ill. 60160; 12% by weight dimethylamide of tall oil; 4% by weight isopropyl alcohol; 5% by weight of nonylphenol ethoxylate containing 12 ethylene oxide groups per molecule; and 44% by weight of heavy aromatic solvent such as xylene or dipentene.

When use is made of the BL-310 corrosion inhibitor, such should be present in the preblend at a level of from about 4 to 75% by weight, and most preferably at a level of about 30% by weight.

The preferred scale inhibitor is purchased commercially under the designation "Phos 2", and is in the form of a 50% water solution of aminotris(methylenephosphonic acid). This product is sold by Buckman Laboratories, Inc. in the form of a clear yellow liquid having a density of 1.38 g/ml., and a pH as received of less than 1. The "Phos 2" material is fully described in a product bulletin entitled "Phos 2 An Organophosphorous Compound for Scale Control", and distributed by Buckman Laboratories, Inc. of Memphis, Tenn.; this bulletin is dated May 25, 1981 and is hereby expressly incorporated by reference herein.

In actual practice the surfactant employed in the preblend composition is a commercially available nonionic surfactant sold under the designation "T-DET N-6" by the Thompson Hayward Chemical Company of Kansas City, Kan. The product is an anhydrous, liquid nonionic surface acting agent produced by the reaction of nonylphenol with 6 moles of etylene oxide. It is in the form of a pale yellow liquid having a pH of about 7, a pour point of less than 0° F., a specific gravity of 25° C. of approximately 1.04 and is dispersible or self-emulsifying with agitation in water. The product is fully described in a bulletin distributed by the manufacturer entitled "T-DET-N-6 (Nonionic Surfactant)"; this product bulletin is hereby expressly incorporated by reference herein.

In preparing the preblend formulation, 10% by weight of the "Phos 2" scale inhibitor is mixed with 30% by weight of the "BL-310" corrosion inhibitor, followed by thorough mixing thereof. Thereafter, 17% by weight of the "T-DET N-6" surfactant is added, along with 1% by weight isopropyl alcohol and 43% by weight solvent (most preferably kerosene or diesel fuel).

A final downhole composition is normally prepared by mixing the above described preblend with water, although in certain applications the preblend can be added to a well without dilution. Advantageously, the final downhole composition would contain from about 10 to 200 ppm of preblend. Within these limits, therefore, the imidazoline component would be present in the composition at a level of from about 0.15 to 50 ppm, and more preferably at a level of from about 0.5 to 10 ppm; the oligomer component would be present at a level of from about 0.2 to 70 ppm, and more preferably from a level of from about 0.6 to 12 ppm. The organophosphonic scale inhibitor would be present at a level of from about 0.2 to 50 ppm, and more preferably at a level of from about 0.5 to 10 ppm. The surfactant component would be present at a level of from about 0.2 to 100 ppm, and more preferably at a level of from about 1.7 to 34 ppm. The solvent would be present at a level of from about 0.5 to 180 ppm, and more advantageously at a level of from about 4.6 to 92 ppm. The alcohol component would be present at a level of from about 0.1 to 40 ppm and more preferably at a level of from about 0.4 to 8 ppm. Water would be present at a level of from about 0.1 to 30 ppm, and more preferably at a level of from about 0.3 to 6 ppm. Finally, the tall oil product described would be present at a level of from about 0.1 to 40 ppm, and more preferably at a level of from about 0.4 to 8 ppm.

In practice the final composition may be introduced into the well either in bulk or over time so as to achieve full coverage of downhole equipment. Introducing the final composition into the well in bulk form typically involves stopping production from the well, pumping the final composition into the well and on into the formation, and starting production from the well. Pumping the final composition into the formation permits the flow of the treating fluid from the formation and through the well tubing, thereby providing continuous treatment of the well during production. Continuous treatment of the well equipment can also be obtained by using a pump to meter the final composition into the well over time.

Having thus described the invention, what is claimed as new and desired to be secured by Letters Patent is:

1. A corrosion and scale inhibiting preblend composition comprising:
    from about 2 to 25% by weight of an imidazoline wherein said imidazoline is selected from the group consisting of compounds having the following structural formula:

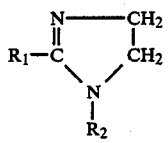

wherein $R_1$ is hydrogen or an alkyl group having up to 18 carbon atoms therein, and $R_2$ is hydrogen, or an alkyl or amine group having up to 18 carbon atoms therein;
    from about 2 to 35% by weight of oligomers of $C_{12}$–$C_{22}$ fatty acids;
    from about 2 to 25% by weight of a scale inhibitor selected from the group consisting of organophosphonic acids and salts thereof; and
    from about 2 to 50% of a nonylphenol ethoxylate surfactant having about 6 ethylene oxide groups per molecule,
    said composition being in the form of a liquid homogeneous dispersion.

2. The composition of claim 1, wherein said imidazoline is present at a level of from about 2 to 9% by weight.

3. The composition of claim 2, wherein said level is about 5% by weight.

4. The composition of claim 1, wherein said oligomer component is present at a level of from about 3 to 12% by weight.

5. The composition of claim 4, wherein said level is about 6% by weight.

6. The composition of claim 1, said oligomer component comprising dimers and trimers of oleic or linoleic acid.

7. The composition of claim 1, wherein said scale inhibitor is present at a level of about 2 to 10% by weight.

8. The composition of claim 7, wherein said level is about 5% by weight.

9. The composition of claim 1, wherein said surfactant is present at about 7 to 25% by weight.

10. The composition of claim 9, wherein the amount of said surfactant is about 17% by weight.

11. The composition of claim 1, including a solvent selected from the group consisting of liquid petroleum products, xylene, toluene, the napthas and mixtures thereof.

12. The composition of claim 11, wherein said solvent is present at a level of about 5 to 90% by weight.

13. The composition of claim 12, wherein said level is about 16 to 82% by weight.

14. The composition of claim 13, wherein said level is about 43% by weight.

15. The composition of claim 1, including an alcohol component taken from the group consisting of isopropyl and absolute alcohol.

16. The composition of claim 15, wherein said alcohol is present at a level of about 1 to 20% by weight.

17. The composition of claim 16, wherein said level is about 2 to 10% by weight.

18. The composition of claim 17, wherein said level is about 4% by weight.

19. The composition of claim 1, wherein said preblend also includes a minor fraction of water.

20. The composition of claim 19, wherein said water is present at about 1 to 15% by weight.

21. The composition of claim 20, wherein the amount of said water is about 1 to 8% by weight.

22. The composition of claim 21, wherein the amount of said water is about 3% by weight.

23. A corrosion and scale inhibiting preblend composition comprising:
    from about 2 to 25% by weight of an imidazoline wherein said imidazoline is selected from the group consisting of compounds having the following structural formula:

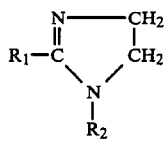

wherein $R_1$ is hydrogen or an alkyl group having up to 18 carbon atoms therein, and $R_2$ is hydrogen, or an alkyl or amine group having up to 18 carbon atoms therein;

from about 2 to 35% by weight of oligomers of $C_{12}-C_{22}$ fatty acids;

from about 2 to 25% by weight of a scale inhibitor selected from the group consisting of organophosphonic acids and salts thereof;

from about 2 to 50% of an nonylphenol ethoxylate surfactant having an average of about 6 ethyleneoxide groups per molecule;

from about 1 to 20% by weight of dimethylamide of tall oil fatty acid, said composition being in the form of a liquid homogeneous dispersion.

24. The composition of claim 23, wherein the amount of said dimethylamide of tall oil fatty acid is about 1 to 10% by weight.

25. The composition of claim 24, wherein the amount of said dimethylamide of tall oil fatty acid is about 4% by weight.

26. An aqueous composition for introduction into an oil or gas well to inhibit corrosion and scale formation, said composition comprising:

from about 0.15 to 50 ppm of an imidazoline wherein said imidazoline is selected from the group consisting of compounds having the following structural formula:

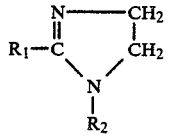

wherein $R_1$ is hydrogen or an alkyl group having up to 18 carbon atoms therein, and $R_2$ is hydrogen, or an alkyl or amine group having up to 18 carbon atoms therein;

from about 0.2 to 70 ppm of oligomers of $C_{12}-C_{22}$ fatty acids;

from about 0.2 to 50 ppm of a scale inhibitor selected from the group consisting of organophosphonic acids and salts thereof; and from 0.2 to 100 ppm of a nonylphenol ethoxylate surfactant having an average of about 6 ethylene oxide groups per molecule.

27. The composition of claim 26, said imidazoline being present at a level of about 0.5 to 10 ppm, said oligomer component being present at a level of about 0.6 to 12 ppm, said scale inhibitor component being present at a level of about 0.5 to 10 ppm, and said surfactant being present at a level of about 1.7 to 34 ppm.

28. The composition of claim 26, including from about 0.5 to 180 ppm of a solvent selected from the group consisting of liquid petroleum products, xylene, toluene, the napthas and mixtures thereof.

29. The composition of claim 26, including an alcohol selected from the group consisting of isopropyl and absolute alcohol, said alcohol component being present at a level of about 0.1 to 40 ppm.

30. An aqueous composition for introduction into an oil or gas well to inhibit corrosion and scale formation, said composition comprising:

from about 0.15 to 50 ppm of an imidazoline wherein said imidazoline is selected from the group consisting of compounds having the following structural formula:

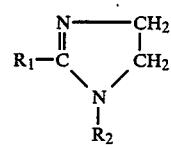

wherein $R_1$ is hydrogen or an alkyl group having up to 18 carbon atoms therein, and $R_2$ is hydrogen, or an alkyl or amine group having up to 18 carbon atoms therein;

from about 0.2 to 70 ppm of oligomers of $C_{12}-C_{22}$ fatty acids;

from about 0.2 to 50 ppm of a scale inhibitor selected from the group consisting of organophosphonic acids and salts thereof; and from 0.2 to 100 ppmof an nonylphenol nonylphenol ethoxylate surfactant having an average of about 6 ethylene oxide groups per molecule, from about 0.1 to 40 ppm of dimethylamide of tall oil fatty acids.

* * * * *